United States Patent [19]
Jiang

[11] Patent Number: 5,914,588
[45] Date of Patent: Jun. 22, 1999

[54] DC/DC CONVERTERS HAVING DUAL, EMI-QUIET OUTPUTS

[75] Inventor: Yimin Jiang, Plano, Tex.

[73] Assignee: Lucent Technologies Inc., Murray Hill, N.J.

[21] Appl. No.: 08/957,918

[22] Filed: Oct. 27, 1997

[51] Int. Cl.[6] ................................................. G05F 1/577
[52] U.S. Cl. ........................... 323/267; 323/272; 363/44; 363/84
[58] Field of Search ..................... 323/267, 272, 323/282, 350, 351; 363/84, 86, 87, 89, 39, 44

[56] References Cited

U.S. PATENT DOCUMENTS

| | | | |
|---|---|---|---|
| 5,155,430 | 10/1992 | Gulczynski | 363/89 |
| 5,227,962 | 7/1993 | Marsh | 363/39 |
| 5,260,862 | 11/1993 | Marsh | 363/39 |
| 5,296,800 | 3/1994 | Bjorkman et al. | 363/89 |
| 5,412,308 | 5/1995 | Brown | 323/267 |
| 5,532,577 | 7/1996 | Doluca | 323/282 |
| 5,552,695 | 9/1996 | Schwartz | 323/272 |
| 5,677,619 | 10/1997 | Doluca | 323/282 |

*Primary Examiner*—Jeffrey Sterrett

[57] ABSTRACT

Various DC/DC converter topologies having improved electromagnetic interference (EMI) characteristics and methods of providing dual DC outputs with such converters. One embodiment of one DC/DC converter having dual, EMI-quiet outputs includes: (1) a first subcircuit, having a series-coupled first switch, first inductor and first capacitor and an output across the first capacitor, coupled between first and second DC input rails, (2) a second subcircuit, having a second switch, second inductor and second capacitor and an output across the second capacitor, coupled between the first and second DC input rails in anti-parallel with the first subcircuit, (3) a first diode coupling a node between the first switch and the first inductor and a node between the second inductor and the second capacitor and (4) a second diode coupling a node between the first inductor and the first capacitor and a second node between the second switch and the second inductor. A further embodiment adds third and fourth series-coupled capacitors coupling the first and second DC input rails and replaces the first and second diodes with: (1) a first converter diode coupling a node between the first switch and the first inductor and a node between the second switch and the second inductor, (2) a first snubber diode coupling a node between the third and fourth capacitors and the node between the first switch and the first inductor and (3) a second snubber diode coupling the node between the third and fourth capacitors and the node between the second switch and the second inductor.

20 Claims, 2 Drawing Sheets

5,914,588

DC/DC CONVERTERS HAVING DUAL, EMI-QUIET OUTPUTS

TECHNICAL FIELD OF THE INVENTION

The present invention is directed, in general, to power conversion and, more specifically, to DC/DC converters having improved topologies that provide dual electromagnetic interference (EMI)-quiet outputs and methods of operation thereof.

BACKGROUND OF THE INVENTION

A power converter is a power processing circuit that converts an input voltage or current source into a specified output voltage or current. In off-line applications wherein power factor correction, total harmonic distortion (THD) reduction and a stable, regulated voltage are desired, the power converter typically employs a boost converter.

The power converter generally includes an electromagnetic interference (EMI) filter, coupled to a source of alternating current (AC) power. A rectifier, coupling the EMI filter to the boost converter, rectifies the AC power to produce an unregulated DC voltage. The boost converter receives the unregulated DC voltage and generates therefrom a controlled, high DC voltage. A DC/DC converter, coupled to the boost converter, then converts the high DC voltage (e.g., 400 VDC) to a lower voltage (e.g., 48 VDC or 24 VDC).

A conventional boost converter generally includes an inductor, coupled between a source of input voltage (e.g., the rectifier that provides the unregulated DC voltage) and a power switch. The power switch is then coupled in parallel with a rectifying diode and an output capacitor. The output capacitor is usually large to ensure a constant output voltage to a load (e.g., a DC/DC converter). The output voltage (measured at the load) of the boost converter is always greater than the input voltage.

For high AC input voltages, in conjunction with the output voltage of a boost converter being greater than the input DC voltage, the output of the conventional boost converter may be too high for commonly available semiconductor devices. For three phase, high AC input voltages, a so-called "split" boost converter that provides two equal output voltages, which are lower than the input voltage, has been suggested to accommodate semiconductor devices rated for the output voltages. Separate DC/DC converters are then used with each output.

Switched-mode power converters generally suffer from EMI noise problems. Power converters, therefore, must be designed to meet domestic and international EMI regulatory requirements. A high switching frequency (e.g., 100 kHz) of the power switches is a major source of EMI. The input EMI filter shields the source of AC power from the EMI generated by the power switches.

Split-boost converters may also contain EMI noisy outputs. One way to filter the switching frequency and thereby obtain EMI quiet outputs is to add an output EMI filter, consisting of an inductor and a capacitor. The output EMI filter normally has high Q characteristics due to practical design considerations. High Q filters, however, are difficult to damp without incurring substantial losses. It would therefore be preferable to eliminate the need for such filters.

Another problem encountered with the split-boost converter is balancing the output voltages. Prior to the closing of the power switches, the output voltages must be close in value to guard against a large circulating current from developing and possibly destroying the power switches. Additionally, if the power switches are not opened or closed simultaneously, the power switch that is closed first or opened last suffers greater turn-on and turn-off losses, respectively, and the switching losses are not evenly distributed between the power switches. It is difficult to predict which power switch suffers the greater switching loss because the switching timing is affected by uncontrollable factors, such as the threshold of the gate drive circuit. As a result, the thermal design of the converter becomes more difficult.

Accordingly, what is needed in the art is an improved DC/DC converter topology that mitigates or substantially eliminates the above-described problems.

SUMMARY OF THE INVENTION

To address the above-discussed deficiencies of the prior art, the present invention provides various DC/DC converter topologies having improved electromagnetic interference (EMI) characteristics and methods of providing dual DC outputs with such converters. One embodiment of one DC/DC converter having dual, EMI-quiet outputs includes: (1) a first subcircuit, having a series-coupled first switch, first inductor and first capacitor and an output across the first capacitor, coupled between first and second DC input rails, (2) a second subcircuit, having a second switch, second inductor and second capacitor and an output across the second capacitor, coupled between the first and second DC input rails in anti-parallel with the first subcircuit, (3) a first diode coupling a node between the first switch and the first inductor and a node between the second inductor and the second capacitor and (4) a second diode coupling a node between the first inductor and the first capacitor and a second node between the second switch and the second inductor.

A further embodiment of a DC/DC converter having dual, EMI-quiet outputs includes: (1) a first subcircuit, having a series-coupled first switch, first inductor and first capacitor and an output across the first capacitor, coupled between first and second DC input rails, (2) a second subcircuit, having a second switch, second inductor and second capacitor and an output across the second capacitor, coupled between the first and second DC input rails in anti-parallel with the first subcircuit, (3) third and fourth series-coupled capacitors coupling the first and second DC input rails, (4) a first converter diode coupling a node between the first switch and the first inductor and a node between the second switch and the second inductor, (5) a first snubber diode coupling a node between the third and fourth capacitors and the node between the first switch and the first inductor and (6) a second snubber diode coupling the node between the third and fourth capacitors and the node between the second switch and the second inductor.

The present invention therefore introduces novel DC/DC converter topologies having DC outputs that are EMI-quieter than earlier split-boost converter designs. EMI-suppression is accomplished by fundamentally rearranging the flow of power within the split-boost converter.

In one embodiment of the present invention, the first and second diodes are forward-biased toward the first subcircuit and a voltage of the first DC input rail is more positive than a voltage of the second DC input rail.

In one embodiment of the present invention, the DC/DC converter further comprises an input capacitor coupled between the first and second DC input rails. Those skilled in the art are familiar with the manner in which input capacitors are employed in DC/DC converter topologies. The present invention employs an input capacitor in a similar manner.

In one embodiment of the present invention, the DC/DC converter is coupled to a rectifier. The rectifier has a DC output coupled to the first and second DC input rails. In a more specific embodiment, the rectifier is a three-phase rectifier. The rectifier, which may rectify any number of AC input phases, is completely unnecessary to the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
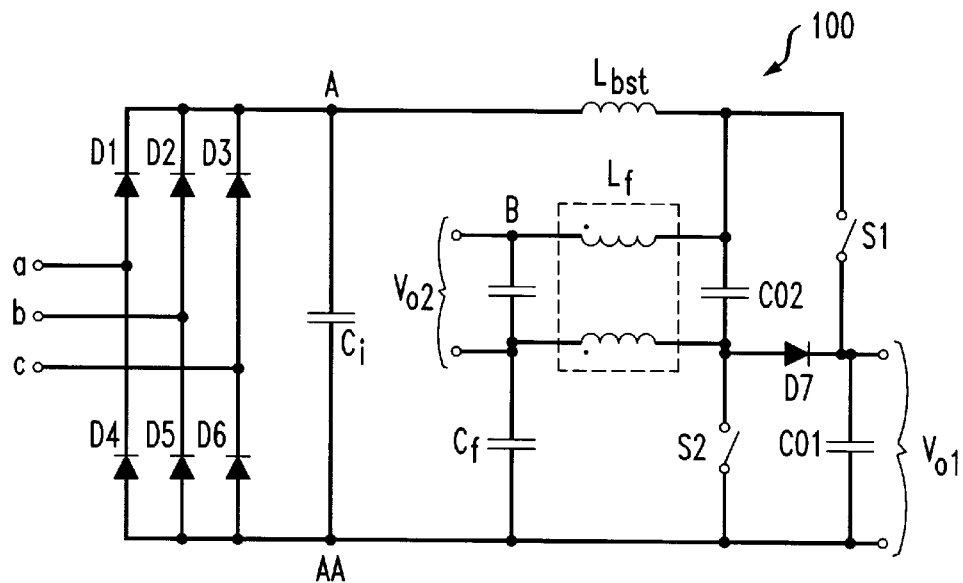
FIG. 1 illustrates a schematic diagram of a split-boost converter.

Referring initially to FIG. 1, illustrated is a schematic diagram of a split-boost converter 100. The converter 100 is more fully disclosed in co-pending U.S. patent application Ser. No. 08/906539, filed on Aug. 5, 1997, entitled "Split-Boost Converter Having Damped EMI Isolation Filter and Method of Operation Thereof" and commonly assigned with the present invention.

The converter 100 is a DC to DC topology showing two output circuits with essentially equal DC output voltages $V_{O1}$, $V_{O2}$. A power train of the converter is interposed between a DC input (designated across nodes A and AA) and the first and second outputs (designated by the DC output voltages $V_{O1}$, $V_{O2}$). The converter 100 includes an boost inductor $L_{bst}$ (the boost power inductor), a pair of capacitors $C_{O1}$, $C_{O2}$ (the output capacitors), a pair of active switches S1, S2, an input capacitor Ci and a passive switch D7 (the boost diode). The capacitors $C_{O1}$, $C_{O2}$ are relatively large, rendering the voltages across them essentially constant during one switching cycle. Since these two output capacitors $C_{O1}$, $C_{O2}$ are isolated, the boost stage requires independent loads. Conventional control circuitry (not shown) drives the active switches S1, S2 and therefore is not described herein.

The switches S1, S2 are turned on and off at substantially the same time, i.e., synchronously. When the switches S1, S2 are turned on, this causes the two capacitors $C_{O1}$, $C_{O2}$ to be connected in parallel since the diode D7 is non-conducting in this mode. A current through the boost inductor $L_{bst}$ increases linearly storing energy in the output capacitors $C_{O1}$, $C_{O2}$ or transferring it to the output loads, as long as the condition $V_O/2 < V_{in} < V_O$ holds; where the output voltage $V_O$ is equal to the first or second output voltage $V_{O1}$, $V_{O2}$ and the input voltage $V_{in}$ is the rectified AC line voltage supplied by a rectifier bridge (including diodes D1, D2, D3, D4, D5, D6). It is the meeting of this last condition that makes this topology well suited to a three phase application using the six-diode bridge rectifier to drive the split-boost stage as shown. When the switches S1, S2 are turned off, the boost inductor $L_{bst}$ is reset through the diode D7 and the now series combination of the capacitors $C_{O1}$, $C_{O2}$. The two output voltages $V_{O1}$, $V_{O2}$ are maintained essentially equal since the capacitors $C_{O1}$, $C_{O2}$ are connected in parallel across switches S1, S2, even if the loads across the two outputs $V_{O1}$, $V_{O2}$ are not equal.

Quality performance of the converter 100 necessitates that the two output voltages $V_{O1}$, $V_{O2}$ be substantially EMI-quiet, and that the converter 100 itself respond in a stable and successful manner to dissipate EMI disturbances without adversely affecting its general overall operation. The first output voltage $V_{O1}$ is inherently EMI-quiet in the converter 100. However, one of the practical issues in designing a split-boost converter 100 is to filter the "bouncing" high-side DC output of the second output voltage $V_{O2}$ with respect to ground in order to make it a substantially EMI-quiet output also. This common-mode bouncing is caused by the boost switching frequency.

The EMI filter may be appropriately designed and placed in the converter 100 to effectively remove this common-mode EMI disturbance. One embodiment of this EMI filter is a LC filter (including a filter inductor $L_f$ and filter capacitor $C_f$) shown in FIG. 1. This LC filter produces a substantially EMI-quiet output at the second output voltage $V_{O2}$ if the corner frequency of this LC filter combination is significantly lower than the boost switching frequency.

Minimizing the peak current levels through the switches S1, S2 is also an important design consideration. Larger ratios $L_f/C_f$ for the filter inductor $L_f$ and filter capacitor $C_f$ are advantageous since they produce higher characteristic impedances which in turn reduce the filter current through the switches S1, S2. Typically, larger values of the filter inductor $L_f$ may be obtained by constructing the filter inductor $L_f$ in a common-mode manner which allows accommodation of a large differential load current. Additionally, high permeability core materials can be used which generally contribute to larger inductance values for the filter inductor $L_f$ as well. As a result, the Q factor of this filter may be made very high thereby enhancing its boost switching frequency filtering effectiveness.

This advantage, however, may be somewhat offset by a high Q circuit's propensity to "ring" or oscillate when presented with spurious environmental disturbances. Although a short period of oscillation may not necessarily affect the proper operation of the converter 100, a practical problem may occur in that the filter inductor $L_f$ normally saturates at a low current value since it is usually constructed to have a large common-mode inductance using a high permeability core as previously stated.

If the filter inductor $L_f$ saturates, all the energy stored in the filter capacitor $C_f$ is dissipated in the first and second switches S1, S2. If such oscillations occur too frequently, the energy lost in the second switch S2 is excessive and may even cause failure of this device. Therefore, this LC filter circuit would have to be more highly damped in order for the converter 100 to operate efficiently and survive repetitive EMI disturbances.

Another problem encountered by the converter 100 is balancing the two output voltages $V_{o1}$, $V_{o2}$. The two output voltages $V_{o1}$, $V_{o2}$ have to be very close in values before the switches S1, S2 can be turned on, otherwise a large circulating current results. This large circulating current can easily destroy the switch S1 and/or switch S2. During certain dynamic processes, the switches S1, S2 may stop switching for a period of time and if the output voltages $V_{o1}$, $V_{o2}$ differ in value greater than a few tens of volts, the switch S1 and possibly switch S2 may not be able to handle the large circulating current when the switches S1, S2 are turned on again. Two diode-resistor pairs may be added in series with the switches S1, S2 to limit the circulating current, however, this requires that the two outputs have well balanced loads to limit the steady-state circulating current. If the circulating current is large, the added resistors also experiences a corresponding large dissipative loss.

The converter 100 also suffers from a dependency on the accuracy of the gate switching timing. If the turning-on and turning-off of the switches S1, S2 are not simultaneous, the switching losses could be unevenly distributed between switch S1 and switch S2. To illustrate, if switch S1 is turned on before switch S2, the initial current through switch S1 could be as high as the full input current before switch S2 is turned on, resulting in a high switch S1 turning-on loss. Similarly, if switch S1 is turned off after switch S2, switch S1 is required to turn off the full input current and consequently, switch S1 suffers a high turning-off loss. The worst case scenario occurs when all the switching losses occur at one location. Furthermore, since the gate timing is affected by other uncontrollable factors, such as the threshold value of the gate drive signal controller (not shown), the switch that might suffer the greatest switching losses is unpredictable. This inherent unpredictability increases the difficulties of the thermal design.

To remedy the above-described deficiencies in the split-boost converter, the present invention discloses a new DC/DC converter topology with two EMI-quiet outputs. The new converter topology may be illustrated and explained in greater detail by referring to FIG. 2.

Figure 2:
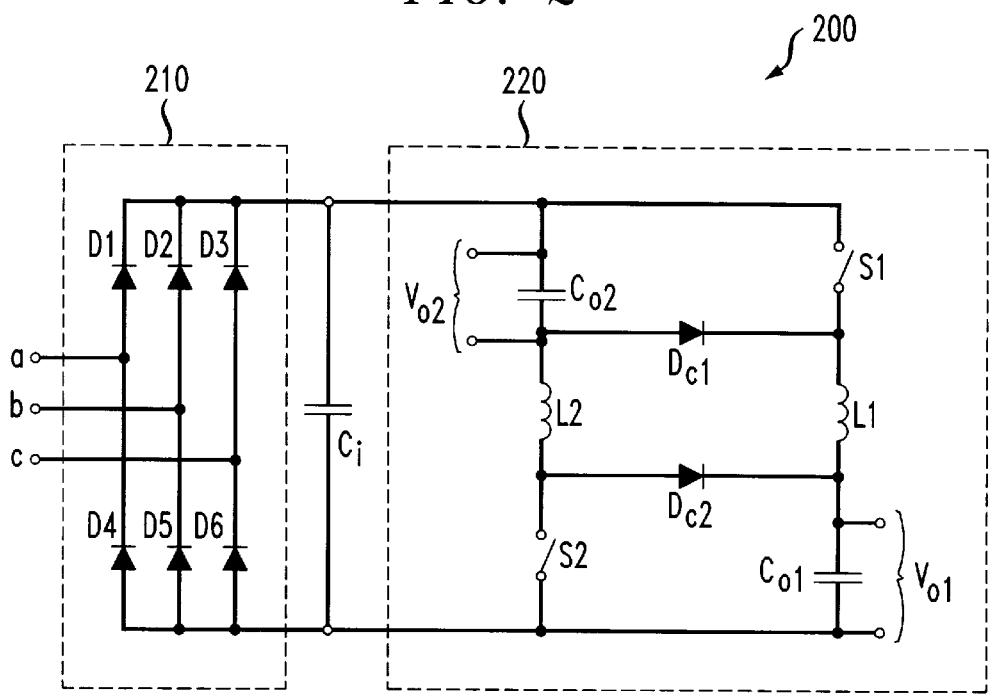
FIG. 2 illustrates a schematic diagram of a power converter employing a first embodiment of a DC/DC converter with two EMI-quiet outputs constructed according to the principles of the present invention.

Turning now to FIG. 2, illustrated is a schematic diagram of a first embodiment of a power converter 200 employing a DC/DC converter 220 with two EMI-quiet outputs constructed according to the principles of the present invention. The power converter 200 includes an AC-to-DC diode rectifier 210, comprising of first, second, third, fourth, fifth and sixth diodes D1, D2, D3, D4, D5, D6, that is coupled to an input capacitor $C_i$. The present invention does not limit the rectifier to any one particular design scheme, those skilled in the art should appreciate that other rectifying schemes may be employed in place of the bridge scheme described above. The input capacitor $C_i$ is also coupled to the DC/DC converter's 220 second output capacitor $C_{o2}$ and second switch S2. The DC/DC converter 220 also includes a second inductor L2 that is coupled between the second switch S2 and the second output capacitor $C_{o2}$. Similarly, a first inductor L1 is shown coupled to a first switch S1 and a first output capacitor $C_{o1}$. A first and second converter diode $D_{c1}$, $D_{c2}$ are shown coupling the first and second inductors L1, L2 together. The first inductor L1, first switch S1 and first output capacitor $C_{o1}$ form a first subcircuit circuit whereas the second inductor L2, second switch S2 and the second output capacitor $C_{o2}$ comprise a second subcircuit circuit.

The operation and characteristics of the converter 200 is analogous to the converter 100 described previously. The converter 200, however, corrects the shortcomings that are inherent in the converter 100. With respect to the converter 100 EMI noisy high-side output of the second output voltage caused by the boost switching frequency, in the converter 200, the high-side output is tied to the top rail which is the positive of the input voltage. Since the top rail is EMI quiet, a LC filter (Lf and Cf in FIG. 1) is not required.

The output voltage balancing limitation identified in the converter 100 is minimized with the introduction of the first and second inductors L1, L2. The output voltage balancing becomes "soft" due to the impedances of the first and second inductors L1, L2, which limits the balancing current from the first output capacitor $C_{o1}$ to the second output capacitor $C_{o2}$ or vice-versa. Furthermore, if the first and second inductor L1, L2 currents are used for current mode control, the current loop automatically limits the first and second inductor L1, L2 currents.

The switching timing of the switches S1, S2 in the converter 200 also becomes less critical because each of the switches S1, S2 carries the corresponding inductor current. Since the first and second inductors L1, L2 currents do not change abruptly, the switching losses are distributed between the first and second switches S1, S2 even with non-synchronous switching.

Figure 3:
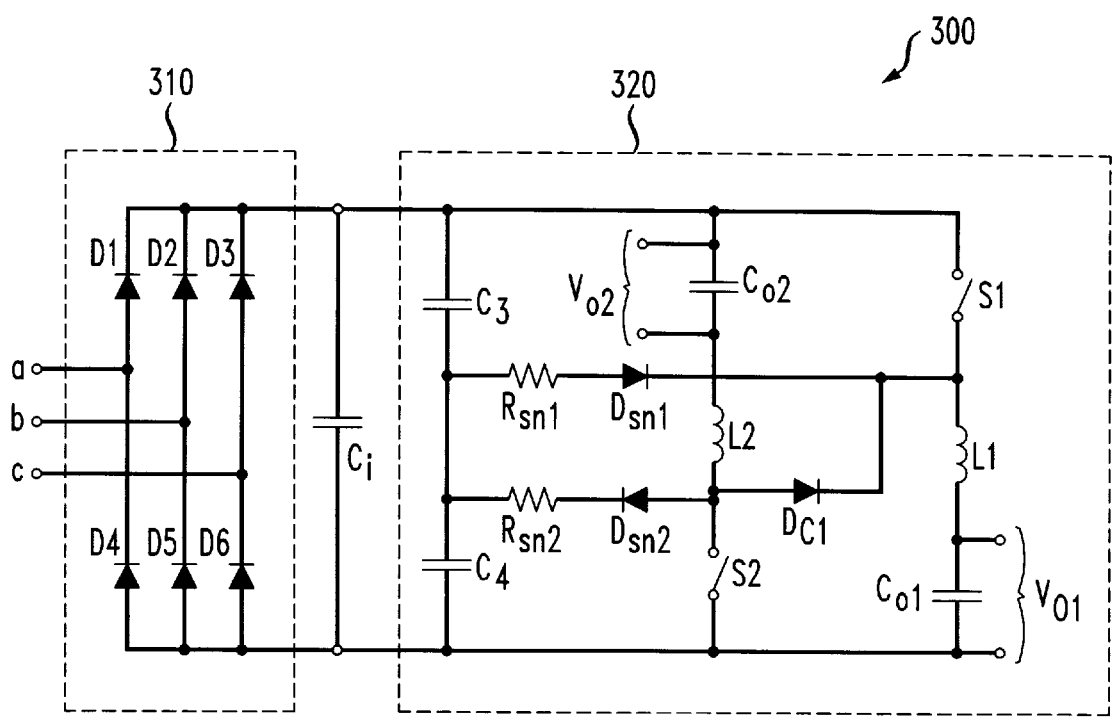
FIG. 3 illustrates a schematic diagram of a power converter employing a second embodiment of a DC/DC converter with two EMI-quiet outputs constructed according to the principles of the present invention.

Turning now to FIG. 3, illustrated is a schematic diagram of a power converter 300 employing a second embodiment of a DC/DC converter 320 with two EMI-quiet outputs constructed according to the principles of the present invention. The converter 300 includes an AC-to-DC diode rectifier 310, comprising of first, second, third, fourth, fifth and sixth diodes D1, D2, D3, D4, D5, D6, that is coupled to an input capacitor $C_i$. The capacitor $C_i$ is also coupled to the DC/DC converter 320. The converter 320 also includes first and second switches S1, S2, first and second output capacitors $C_{o1}$, $C_{o2}$, first and second inductors L1, L2 and a first converter diode $D_{c1}$. A third and fourth capacitor C3, C4 are also shown coupled to first and second snubber resistors $R_{sn1}$, $R_{sn2}$ and to first and second snubber diodes $D_{sn1}$, $D_{sn2}$. In the illustrated embodiment, the third and fourth capacitors C3, C4 are a matched pair, i.e., equal value.

As with the converter 100 illustrated in FIG. 1, the first and second switches S1, S2 are turned on and turned off simultaneously and the input voltage should be greater than the any one of the output voltages $V_{o1}$, $V_{o2}$ measured across the first and second output capacitors $C_{o1}$, $C_{o2}$, respectively, but less than the two output voltages in series. Under steady-state conditions with two balanced loads, the two output voltages are equal and the first and second inductor L1, L2 currents are also equal.

When the switches S1, S2 are turned on, the voltages across both the first and second inductors L1, L2 are given by (Vin−Vout), where Vin is the voltage measured across the input capacitor Ci and Vout is $V_{o1}$ ($V_{o1}$ and $V_{o2}$ being substantially equal). The currents in the first and second inductors L1, L2 are also increasing at the same rate. When the switches S1, S2 are turned off, the first and second inductors L1, L2 are configured in series and the first converter diode $D_{c1}$ provides a current path for the first and second inductors L1, L2 currents. At this time, the voltages across both the first and second inductors L1, L2 are (0.5Vin−Vout) and the currents in the first and second inductors L1, L2 are also reducing at the same rate.

Since the steady-state voltages across the first and second switches S1, S2 are 0.5Vin, two snubber paths consisting of the first and second snubber resistors $R_{sn1}$, $R_{sn2}$ and the first and second snubber diodes $D_{sn1}$, $D_{sn2}$ clamp the voltages across the first and second switches S1, S2. The two snubber paths also provide current paths in the event that the first and second inductors L1, L2 are not equal.

The converter topology illustrated in FIG. 3 and described above provides the additional advantages of lower root-mean-square (RMS) currents in the first and second output capacitors $C_{o1}$, $C_{o2}$ and lower voltage stresses on the first and second switches S1, S2 over the topologies of the converters 100, 200 illustrated in FIGS. 1 and 2.

Although the present invention has been illustrated in the embodiments above in conjunction with a three-phase AC input, those skilled in the art should appreciate that the present invention is not limited to only a three-phase AC input. The present invention also encompasses a single or other multiple phase AC inputs.

Although the present invention and its advantages have been described in detail, those skilled in the art should understand that they can make various changes, substitutions and alterations herein without departing from the spirit and scope of the invention in its broadest form.

What is claimed is:

1. A DC/DC converter, comprising:
    a first subcircuit, having a series-coupled first switch, first inductor and first capacitor and an output across said first capacitor, coupled between first and second DC input rails;
    a second subcircuit, having a second switch, second inductor and second capacitor and an output across said second capacitor, coupled between said first and second DC input rails in anti-parallel with said first subcircuit;
    a first diode coupling a node between said first switch and said first inductor and a node between said second inductor and said second capacitor; and
    a second diode coupling a node between said first inductor and said first capacitor and a second node between said second switch and said second inductor.

2. The DC/DC converter as recited in claim 1 wherein said first and second diodes are forward-biased toward said first subcircuit and a voltage of said first DC input rail is more positive than a voltage of said second DC input rail.

3. The DC/DC converter as recited in claim 1 further comprising an input capacitor coupled between said first and second DC input rails.

4. The DC/DC converter as recited in claim 1 wherein said DC/DC converter is coupled to a rectifier having a DC output coupled to said first and second DC input rails.

5. The DC/DC converter as recited in claim 4 wherein said rectifier is a three-phase rectifier.

6. A method of providing dual DC outputs with a DC/DC converter, comprising the steps of:
    processing a first portion of DC input power through a first subcircuit having a series-coupled first switch, first inductor and first capacitor and an output across said first capacitor and coupled between first and second DC input rails;
    processing a second portion of said DC input power through a second subcircuit having a second switch, second inductor and second capacitor and an output across said second capacitor and coupled between said first and second DC input rails in anti-parallel with said first subcircuit;
    selectively conducting power through a first diode coupling a node between said first switch and said first inductor and a node between said second inductor and said second capacitor; and
    selectively conducting power through a second diode coupling a node between said first inductor and said first capacitor and a second node between said second switch and said second inductor.

7. The method as recited in claim 6 wherein said first and second diodes are forward-biased toward said first subcircuit and a voltage of said first DC input rail is more positive than a voltage of said second DC input rail.

8. The method as recited in claim 6 further comprising the step of processing said DC input power through an input capacitor coupled between said first and second DC input rails.

9. The method as recited in claim 6 further comprising the step of receiving said DC input power from a rectifier having a DC output coupled to said first and second DC input rails.

10. The method as recited in claim 9 wherein said rectifier is a three-phase rectifier.

11. A DC/DC converter, comprising:
    a first subcircuit, having a series-coupled first switch, first inductor and first capacitor and an output across said first capacitor, coupled between first and second DC input rails;
    a second subcircuit, having a second switch, second inductor and second capacitor and an output across said second capacitor, coupled between said first and second DC input rails in anti-parallel with said first subcircuit;
    third and fourth series-coupled capacitors coupling said first and second DC input rails;
    a first converter diode coupling a node between said first switch and said first inductor and a node between said second switch and said second inductor;
    a first snubber diode coupling a node between said third and fourth capacitors and said node between said first switch and said first inductor; and
    a second snubber diode coupling said node between said third and fourth capacitors and said node between said second switch and said second inductor.

12. The DC/DC converter as recited in claim 11 wherein said first converter and said first snubber diodes are forward-biased toward said first subcircuit, said second snubber diode is forward-biased away from said first subcircuit and a voltage of said first DC input rail is more positive than a voltage of said second DC input rail.

13. The DC/DC converter as recited in claim 11 further comprising an input capacitor coupled between said first and second DC input rails in parallel with said third and fourth capacitors.

14. The DC/DC converter as recited in claim 11 wherein said DC/DC converter is coupled to a rectifier having a DC output coupled to said first and second DC input rails.

15. The DC/DC converter as recited in claim 14 wherein said rectifier is a three-phase rectifier.

16. A method of providing dual DC outputs with a DC/DC converter, comprising the steps of:
    processing a first portion of DC input power through a first subcircuit having a series-coupled first switch, first inductor and first capacitor and an output across said first capacitor and coupled between first and second DC input rails;
    processing a second portion of DC input power through a second subcircuit having a second switch, second inductor and second capacitor and an output across said second capacitor and coupled between said first and second DC input rails in anti-parallel with said first subcircuit;
    processing a third portion of said DC input power through third and fourth series-coupled capacitors coupling said first and second DC input rails;

selectively conducting power through a first converter diode coupling a node between said first switch and said first inductor and a node between said second switch and said second inductor;

selectively conducting power through a first snubber diode coupling a node between said third and fourth capacitors and said node between said first switch and said first inductor; and selectively conducting power through a second snubber diode coupling said node between said third and fourth capacitors and said node between said second switch and said second inductor.

17. The method as recited in claim 16 wherein said first converter and said first snubber diodes are forward-biased toward said first subcircuit, said second snubber diode is forward-biased away from said first subcircuit and a voltage of said first DC input rail is more positive than a voltage of said second DC input rail.

18. The method as recited in claim 16 further comprising the step of processing said DC input power through an input capacitor coupled between said first and second DC input rails in parallel with said third and fourth capacitors.

19. The method as recited in claim 16 further comprising the step of receiving said DC input power from a rectifier having a DC output coupled to said first and second DC input rails.

20. The method as recited in claim 19 wherein said rectifier is a three-phase rectifier.

* * * * *